United States Patent [19]
Marckel

[11] Patent Number: 5,452,852
[45] Date of Patent: Sep. 26, 1995

[54] VALVES AND AN IMPROVED METHOD OF REPLACING VALVES IN PRESSURIZED SYSTEMS

[76] Inventor: Michael L. Marckel, 6200 Metz Rd., Angola, Ind. 46703

[21] Appl. No.: 249,250

[22] Filed: May 25, 1994

[51] Int. Cl.⁶ ............................................... F01P 7/16
[52] U.S. Cl. .................................. 236/34.5; 137/75
[58] Field of Search ................ 236/34, 34.5; 137/72, 137/74, 75

[56] References Cited

U.S. PATENT DOCUMENTS

| | | | |
|---|---|---|---|
| 1,564,504 | 12/1925 | Woolson | 236/93 R |
| 1,952,516 | 3/1934 | Sperry et al. | 236/34 |
| 2,301,014 | 11/1942 | Burklin | 137/75 |
| 2,735,443 | 2/1956 | Beck | 137/493.3 |
| 2,903,005 | 9/1959 | Anderson et al. | 137/75 |
| 2,943,636 | 7/1960 | Reed et al. | 137/220 |
| 3,498,537 | 3/1970 | Wong | 236/34 |
| 3,618,627 | 11/1971 | Wagner | 137/73 |
| 3,730,205 | 5/1973 | Guimbellot | 137/73 |
| 3,734,115 | 5/1973 | McMath | 137/73 |
| 4,164,034 | 8/1979 | Rogers, Jr. et al. | 137/75 X |
| 4,469,275 | 9/1984 | DeSalve | 236/93 A |
| 4,562,853 | 1/1986 | Tschirky et al. | 137/75 |
| 4,883,225 | 11/1989 | Kitchens | 236/34.5 |
| 4,974,623 | 12/1990 | Sturgis | 137/75 X |
| 4,981,260 | 1/1991 | Beiser | 137/74 X |
| 5,004,003 | 4/1991 | Gray, Jr. | 137/75 |

Primary Examiner—William E. Tapolcai
Attorney, Agent, or Firm—Lundy and Associates

[57] ABSTRACT

A fluid valve comprising a frame having a valve seat defining a flow passage and an actuator secured to the frame. A valve is secured to the actuator and movable into and out of engagement with the valve seat in response to the actuator for closing and opening the flow passage. A spacer is positioned between the valve and the valve seat. The spacer holds the valve and valve seat apart and the valve open. The spacer is of a disappearing material at predetermined fluid conditions allowing the valve to be installed in a fluid system, the system to be filled with fluid, and the system brought to normal operating conditions, simultaneously, in accordance with the method of the invention.

30 Claims, 4 Drawing Sheets

FIG. 1

PRIOR ART

FIG 2

PRIOR ART

VALVES AND AN IMPROVED METHOD OF REPLACING VALVES IN PRESSURIZED SYSTEMS

BACKGROUND OF THE INVENTION

This invention relates to improved fluid valves, and more particularly to an improved fluid valve for use in fluid systems in which the valve is released after a trigger temperature or pressure is reached and an improved method of replacing valves in pressurized systems utilizing such valves.

Fluid valves are used in a number of systems to control flow. These valves may be actuated by temperature as in a thermostatic valve or by pressure as in a pressure relief valve. By far the most prevalent use of thermostatic valves are in the cooling-systems of internal combustion engines. In these systems, thermostatic valves control the flow of fluid throughout the system in accordance with the temperature of the fluid. In modern automotive engines, the cooling system is not only used to cool the internal combustion engine, but also the transmission, and is used to heat the interior of the automobile.

In such systems, it is difficult, if not impossible, to fill the cooling system after a thermostatic valve has been replaced without incrementally filling the system, operating the system, allowing the system to cool, filling the system again, operating the system, and allowing the system to cool, etc., until the system is completely full, as there is no way to bleed the system and fill the system while the system is under pressure or while the system is being brought to operating temperatures without blowing out steam or hot antifreeze under pressure and endangering personnel and preventing complete filling of the radiator. Until the system is brought to operating temperatures, the thermostatic valve just installed prevents the coolant from freely circulating throughout the system and the air to bleed from the system.

This difficulty with regard to pressurized cooling systems of internal combustion engines has plagued engine repairmen for years.

It is therefore highly desirable to provide an improved fluid valve and an improved method for replacing such valves in fluid systems equipped with such valves.

It is also highly desirable to provide an improved fluid valve and an improved method for replacing such valves in all types of pressurized fluid systems.

It is also highly desirable to provide an improved method by which pressurized cooling systems equipped with thermostatic valves can be repaired by replacing the valves when defective and completely filling the system all in a single, simple and efficient procedure.

It is also highly desirable to provide an improved thermostatic fluid valve which can be installed in such systems and the system filled without the necessity of repeatedly incrementally filling the system as has been necessary in the past.

It is also highly desirable to provide an improved fluid valve for use in controlling the pressure of a fluid system.

It is also highly desirable to provide an improved fluid valve for use in temporarily controlling the pressure or temperature in pressurized fluid systems.

It is finally highly desirable to provide an improved fluid valve and an improved method having all of the above desired features.

Pressure relief fluid valves are also used in other systems, such as in automatic hot water systems, in fire fighting systems, and in automatic transmissions in which pressure may be decreased or fluid flow increased upon the system rising above certain predetermined pressures. These valves function upon the system arriving at a predetermined pressure in the same manner as the above-identified thermostatic valves for vehicular cooling systems function upon the system arriving at a predetermined temperature.

SUMMARY OF THE INVENTION

It is therefore an object of the invention to provide an improved fluid valve and an improved method for replacing such valves in fluid systems equipped with such valves.

It is also an object of the invention to provide an improved fluid valve and an improved method for replacing such valves in all types of pressurized fluid systems.

It is also an object of the invention to provide an improved method by which pressurized cooling systems equipped with thermostatic valves can be repaired by replacing the valves when defective and completely filling the system all in a single, simple and efficient procedure.

It is also an object of the invention to provide an improved thermostatic fluid valve which can be installed in such systems and the system filled without the necessity of repeatedly incrementally filling the system as has been necessary in the past.

It is also an object of the invention to provide an improved fluid valve for use in controlling the pressure of a fluid system.

It is also an object of the invention to provide an improved fluid valve for use in temporarily controlling the pressure or temperature in pressurized fluid systems.

It is finally an object of the invention to provide an improved fluid valve and an improved method having all of the above desired features.

In the broader aspects of the invention, there is provided a fluid valve comprising a frame having a valve seat defining a flow passage and an actuator secured to the frame. A valve is secured to the actuator and movable into and out of engagement with the valve seat in response to the actuator for closing and opening the flow passage. A spacer is positioned between the valve and the valve seat. The spacer holds the valve and valve seat apart and the valve open. The spacer is of a disappearing material at predetermined fluid conditions allowing the valve to be installed in a fluid system, the system to be filled with fluid, and the system brought to normal operating conditions and pressures, simultaneously, in accordance with the method of the invention.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
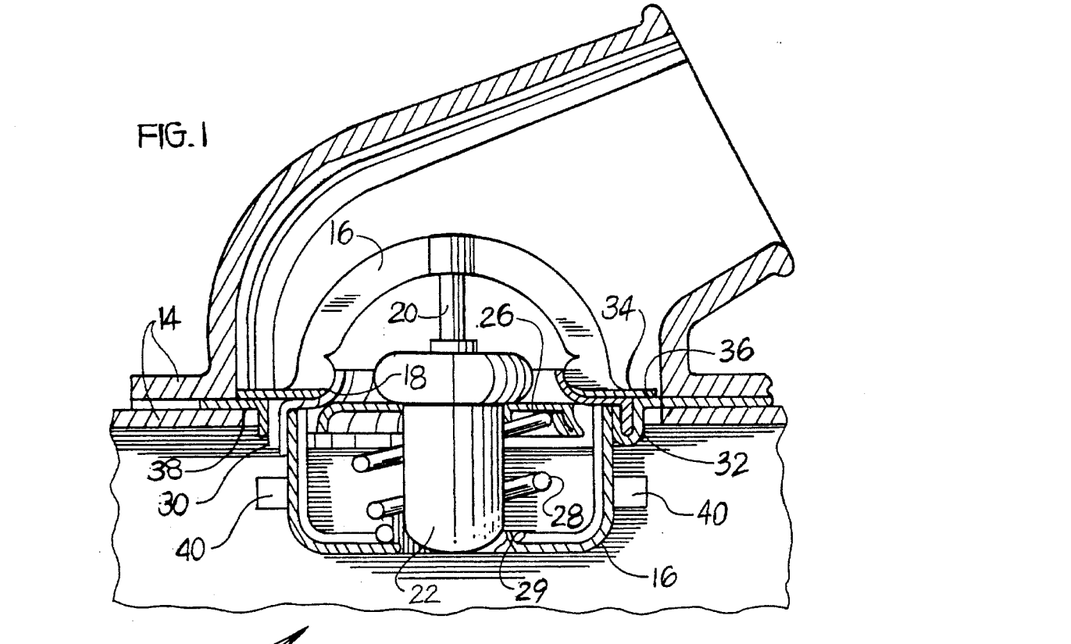
FIG. 1 is a sectional view of a prior art valve structure mounted within the conduit structure of a cooling system of an internal combustion engine which may be used in the invention.

FIG. 1 shows a prior art valve 10 disposed within conduit structure 14. One such structure is disclosed in U.S. Pat. No. 3,498,537. The valve structure comprises a frame 16 which has an annular valve seat 18 forming a fluid port therethrough. Attached to the frame 16 is a stem 20 which extends through the fluid port which is formed by the valve seat 18.

The stem 20 has a portion thereof disposed within a container 22 which contains thermally responsive expansible-contractible material, not shown, in a thermostatic valve embodiment. The stem 20 and the container 22 with the thermally responsive expansible-contractible material therein thus serves as an actuator, and may be of the type disclosed in U.S. Pat. Nos. 2,806,375 and 2,806,376 or may be of any other suitable type. During expansion of the thermally responsive material within the container 22 there is relative movement between the stem 20 and the container 22, in a direction one away from the other.

A closure member or valve 26 is attached to the container 22 for movement therewith. A helical spring 28 encompasses the container 22 and has one end portion thereof in engagement with the closure member 26. The other end portion of the helical spring 28 is in engagement with the frame 16. Thus, the spring 28 also serves as an actuator urging the closure member 26 toward the valve seat 18 for normal engagement therewith, as shown in FIG. 1.

The portion of the spring 28 which engages the frame 16 encompasses an annular guide portion 29 of the frame 16 through which the Container 22 is axially movable.

In another embodiment which is not thermally responsive, container 22 is empty or filled with temperature inert material or is merely a telescoping guide rod (not shown), and valve 10 is a non-thermostatic spring loaded valve.

Figure 2:
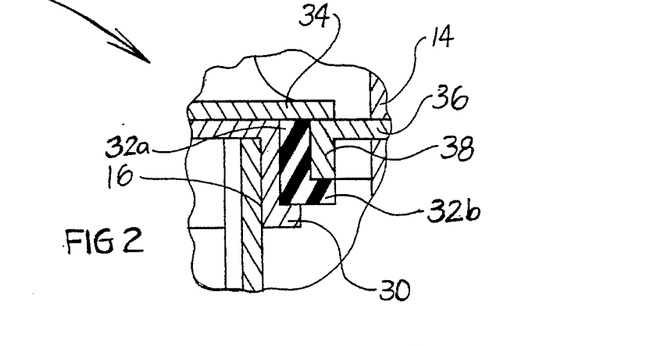
FIG. 2 is an enlarged, fragmentary sectional view of a portion of the valve structure shown in FIG. 1.
Figure 3:
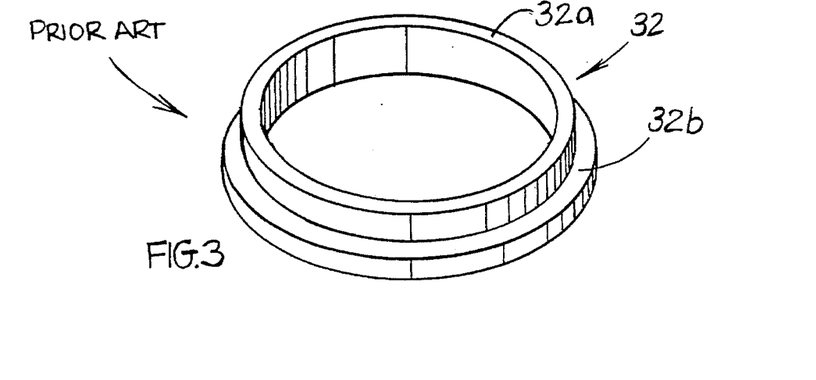
FIG. 3 is a perspective view drawn on a slightly smaller scale than FIG. 2 of the connection member of the valve structure shown in FIG. 2.
Figures 6, 7:
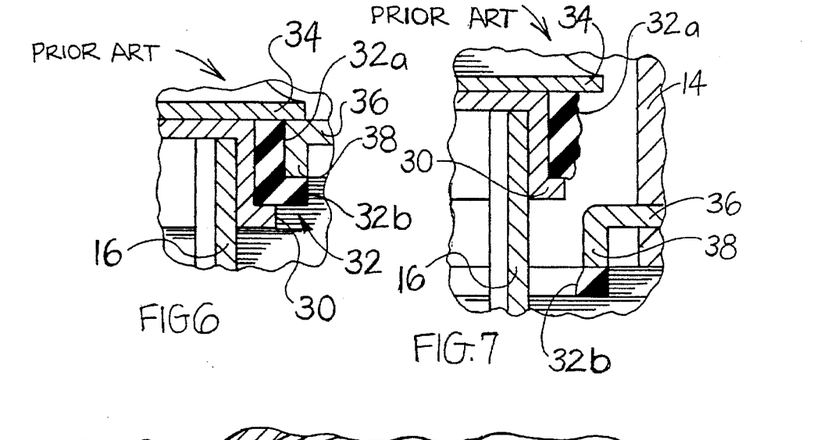
FIG. 6 is a sectional view taken substantially along section line 6—6 of FIG. 5.
FIG. 7 is an enlarged, fragmentary sectional view, similar to FIGS. 2 and 6, illustrating the fail-safe operation of the connector means shown in FIG.

In a fail-safe version of the valve 10, the frame 16 is provided with an annular projection 30. An annular connector member 32 engages the annular projection 30 and the frame 16 adjacent thereto. The connector member 32 comprises a cylindrical portion 32a and a lateral portion 32b, as best shown in FIGS. 2 and 6. The connector member 32 consists of any suitable fusible material which is normally rigid. The connector member 32 may consist of solder, or plastics material, or the like, which fuses or melts or at least becomes soft at a temperature slightly above the normal operating temperature of the thermostatic valve structure. The connector member 32 may also have a frangible characteristic or may have a portion thereof which is readily frangible.

An annular extension disc 34 is attached to the frame 16 and extends therefrom and engages an annular flange 36, as shown in FIGS. 1, 2, 4 and 6. The annular flange 36 has a collar 38 which is normal thereto and which is in engagement with the portions 32a and 32b of the connector member 32. The connector member 32 joins the frame 16 to the flange 36.

In the non-fail-safe version of the invention, the flange 36 is directly secured to, as for example, by brazing, and extends from frame 16.

The annular flange 36 of both structures extends outwardly from the frame 16 and is shown clamped between two portions of the conduit structure 14. Thus, the valve structure of this invention is adapted to be retained within a fluid conduit, such as the conduit 14, to control flow of fluid therethrough.

As shown in FIG. 1, the valve structure of this invention, disposed within the fluid conduit structure 14, controls the flow of fluid from the lower portion of the conduit structure 14 to the upper portion thereof.

In the thermostatic valve of the invention, fluid at the lower portion of the conduit structure 14 engages the container 22. When the temperature of the fluid which engages the container 22 is below a given value, the container 22 is positioned as shown in FIG. 1. This is due to the fact that the thermally responsive material within the container 22 at a temperature below the given value does not exert a force upon the stem 20 within the container 22 for urging relative movement between the stem 20 and the container 22. Therefore, the spring 28 maintains the closure member 26 in engagement with the valve seat 18. Thus, as shown in FIG. 1, the thermostatic valve structure is closed and fluid cannot flow through the fluid port formed by the annular valve seat 18.

Figures 4, 5:
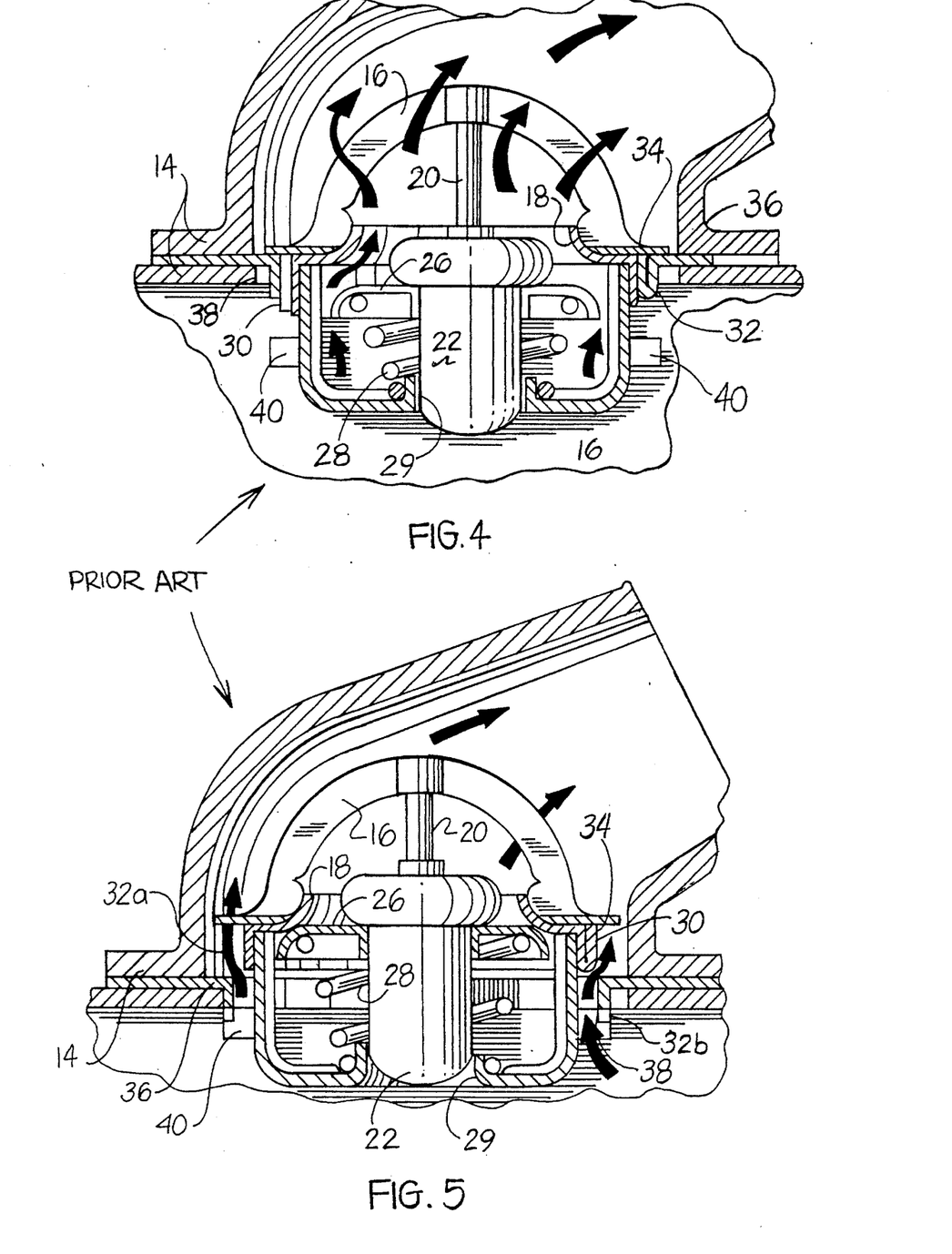
FIG. 4 is a sectional view similar to FIG. 1 showing the prior art valve structure shown in FIG. 1 in an open operating condition.
FIG. 5 is a sectional view similar to FIGS. 1 and 4 showing a prior art fail-safe valve structure in a condition following failure which may be used in the invention.

If the temperature of the fluid which is in engagement with the container 22 increases above a given predetermined value, the thermally responsive material within the container 22 expands to such an extent that the thermally responsive material therewithin causes relative movement between the stem 20 and the container 22. Due to the fact that the stem 20 is attached to the frame 16, the container 22 moves in a downward direction away from the stem 20, as the stem 20 remains within the container 22. Thus, the container 22 moves the closure member 26 downwardly and away from the valve seat 18, as illustrated in FIG. 4. Downward movement of the container 22 is guided by the guide portion 29 of the frame 16 through which the container 22 extends. Thus, fluid flows through the fluid port formed by the annular valve seat 18, as illustrated in FIG. 4. Such downward movement of the closure member 26 is against the forces of the spring 28.

When the temperature of the fluid engaging the container 22 decreases below the predetermined given value, the thermally responsive material therewithin decreases in volume. Therefore, the spring 28 forces the closure member 26 toward the valve seat 18. If the temperature of the fluid engaging the container 22 decreases sufficiently, the spring 28 is permitted to force the closure member 26 into engagement with the valve seat 18 to again close the fluid port formed thereby, in the manner illustrated in FIG. 1. Thus, during normal operation, the closure member 26 moves toward and away from the valve seat 18 and controls flow of fluid through the fluid port formed by the valve seat 18. Such movement is in response to the changes in temperature of the fluid which is in contact with the container 22.

In the non-thermostatic valve 10 of the invention, fluid at the lower portion of the conduit structure 14 engages the closure member of valve 26 and is stopped from flowing through the valve 10. The helical spring 28 maintains the closure member of valve 26 in engagement with the valve seat 18 at all times until the pressure within the conduit structure 14 places a sufficient force on the valve 26 to overcome the urging of the spring 28 to move the closure member or valve 26 from the valve seat 18 opening the fluid port of the valve 10 and allowing fluid to flow therethrough as shown in FIG. 4. At all flow rates and temperatures at pressures below the predetermined pressure which is sufficient to overcome the urging of spring 28, closure member or valve 26 is seated on valve seat 18 and the valve is closed as shown in FIG. 1.

In the fail-safe structure of either the pressure or temperature actuated versions of the valve 10 of the invention, means are provided for protection of the apparatus with which the fluid conduit 14 is associated, in the event that a defect should occur in the valve structure of this invention which affects the normal operation thereof. If such a defect should occur, the closure member 26 may not be moved in a direction from the valve seat 18 as desired. Therefore, the fluid port formed by the valve seat 18 is not opened. Thus, the temperature of the fluid in engagement with the container 22 may become excessively high without flow or circulation of the fluid within the conduit structure 14.

The fluid which engages the container 22 also engages the connector member 32. Thus, the connector member 32 is heated. If the connector member 32 is heated to a predetermined temperature, which is in excess of the normal operating temperature of the container 22, the heat applied to the connector member 32 causes the connector member 32 to fuse or melt or to break or at least to soften from its normal rigid condition. Thus, pressure of the fluid upon the lower surface of the closure member 26 forces a major portion of the thermostatic valve structure upwardly, as shown in FIG. 5, and portions of the connector member 32 are severed one from the other, as illustrated in FIGS. 5 and 7. All elements of the valve structure move upwardly, except the flange 36 and perhaps, a portion of the connector member 32, as shown in FIG. 5. Thus, fluid is permitted to flow from the lower portion of the conduit structure 14 to the upper portion thereof, as shown in FIGS. 5 and 7.

The connector member 32 is of such physical dimensions and characteristics that a predetermined quantity of heat therein and/or a predetermined total pressure applied thereto causes separation of portions of the connector member 32 in the manner best illustrated in FIG. 7.

As the frame 16 moves upwardly following breaking of the connector member 32, one or more lugs 40 which are attached to the frame 16 engage the collar 38 of the flange 36, as shown in FIG. 5. Thus, the frame 16 is limited in its movement with respect to the fluid conduit structure 14.

Figures 8, 9, 10, 11, 12:
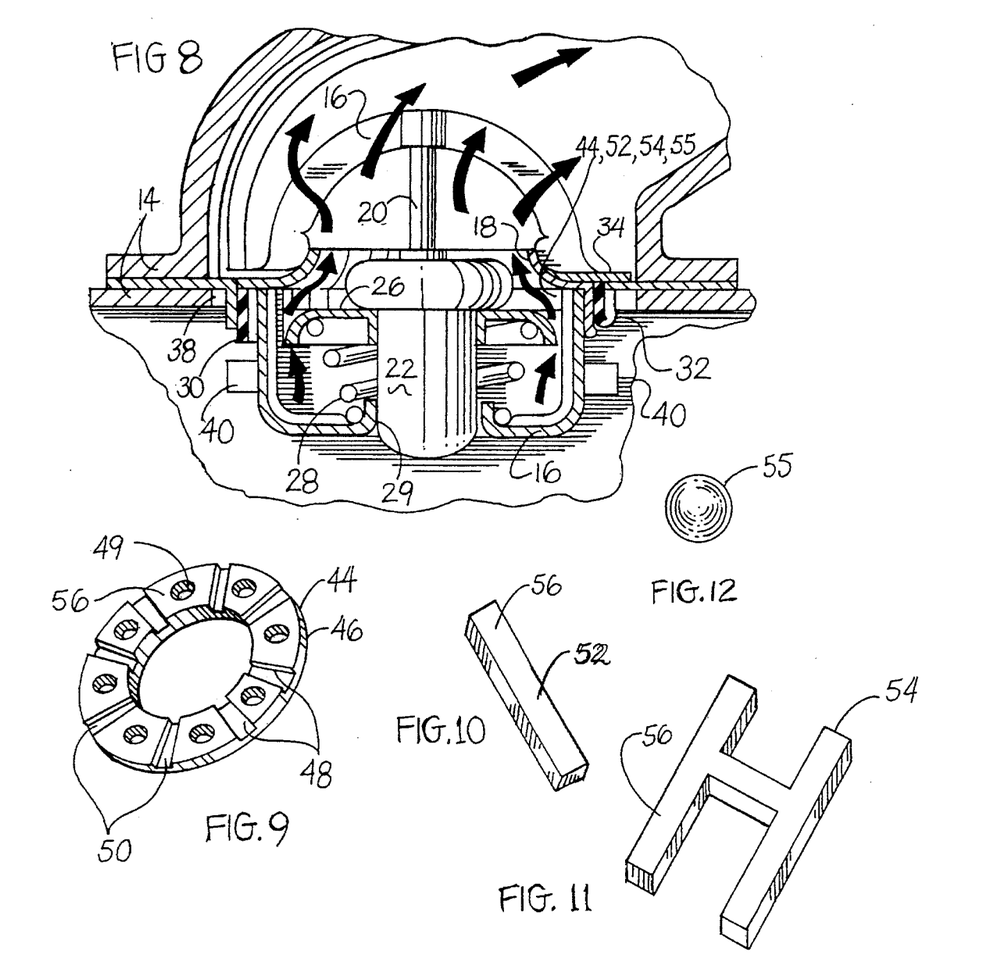
FIG. 8 is a sectional view, similar to FIG. 4, showing the valve structure of the invention with the spacers 44, 52, 54 and 55 positioned between the valve and the valve seat of the invention.
FIGS. 9, 10, 11, and 12, respectively, are perspective views of alternate spacers of this invention.
Figure 13:
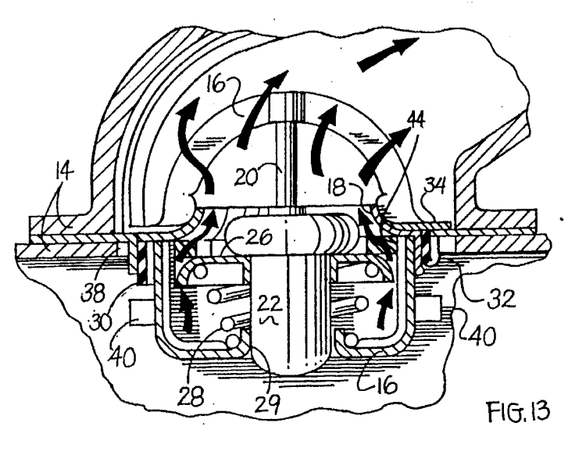
FIG. 13 is a sectional view, similar to FIG. 8, showing the spacer 44 of FIG. 9 between the valve and valve seat of the valve structure of the invention specifically showing the spacer 44 in cross-section, the bores 49 and the grooves 48.
Figure 14:
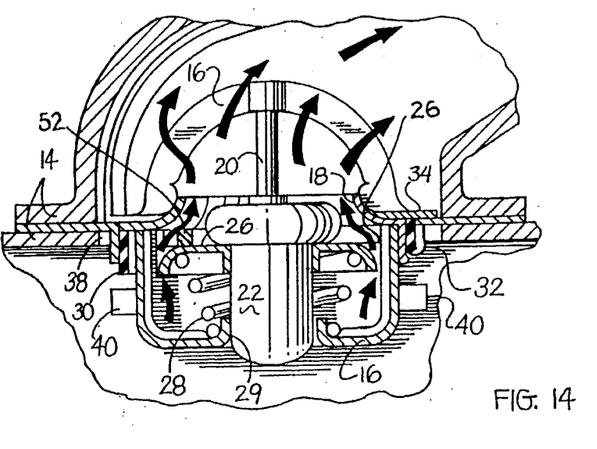
FIG. 14 is a sectional view, similar to FIG. 8, showing the valve structure of the invention with the spacer 52 between the valve and valve seat of the invention showing the spacer 52 in cross-section.
Figure 15:
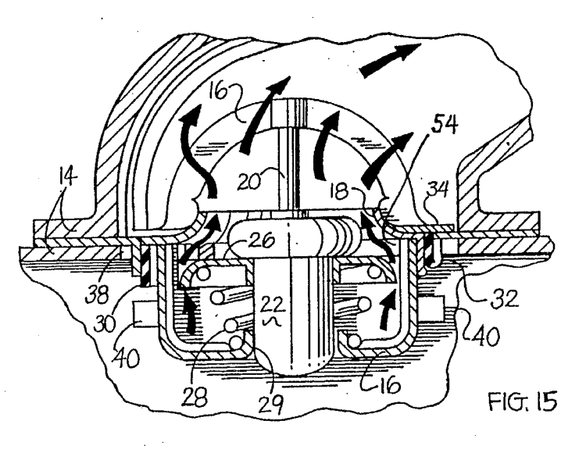
FIG. 15 is a sectional view, similar to FIG. 8, showing the valve structure of the invention with the spacer 54 positioned between the valve and valve seat of the invention showing the cross bar of the spacer 54 in cross-section.
Figure 16:
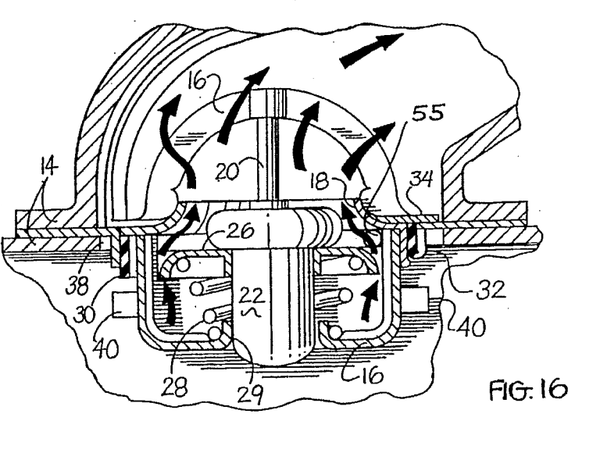
FIG. 16 is a sectional view, similar to FIG. 8, showing the valve structure of the invention with the spacer 55 positioned between the valve and the valve seat of the invention in a position 90 degrees removed from that shown in FIG. 8.

In all of the embodiments of the valve 10 of the invention, i.e., the thermostatic valve 10, the pressure relief valve 10, the fail-safe pressure relief valve 10, and the fail-safe thermostatic valve 10, spacers 44, 52, 54, 55 is positioned between valve 26 and valve seat 18 as shown in FIG. 8. Spacers 44, 52, 54, 55 are of a material which has sufficient compressive strength to hold the valve 26 and valve seat 18 apart. Spacers 44, 52, 54, 55 may have a number of configurations as shown in FIGS. 9 through 12. In FIG. 9, spacer 44 is in the form of an annular ring with a central passage 45 and an outer periphery 46. Spacer 44 has a plurality of radially extending grooves 48 or holes 49 cut therein which define with valve 26 or valve seat 18 liquid flow passages 50 through which fluid will flow. FIG. 12 shows non-melting, non-soluble, non-corrosive spheres 55 which will disappear in the fluid flow once the valve opens enough to release them into the fluid flow. FIGS. 10 and 11 show other embodiments 52 and 54 of spacer 44 in which spacer 44 comprises elongated elements 54 having a specified length to diameter ratio. This ratio varies with the material as does the cross-sectional thickness of the disc 44 described below.

The material from which spacers 44, 52 and 54 are made also varies. The common properties of the material are that it will disappear when exposed to the fluid flowing through conduit structure 14 consistent with the operation of the thermostatic valve 10 of the invention. The material may either dissolve in the fluid flowing past and through spacers 44, 52 and 54, or melt at an elevated temperature and/or be carried away by the fluid flowing past and through spacers 44, 52 and 54. In other specific embodiments, the molecular structure of the material will sever at a chemical bond at the predetermined temperature thereby forming materials which either melt at the predetermined temperature or is dissolved by the fluid passing through or by spacers 44, 54 at the predetermined temperature.

The thickness or length to diameter ratio of spacers 44, 52 and 54 (the spacers that dissolve or melt) is determined by the time that the thermostatic valve 10 is desirably held open and the time that it would take for spacers 44, 52 and 54 to dissolve or melt at the predetermined temperature. Coatings 56 may be applied to spacers 44, 52 and 54 to retard melting or dissolving as required. A sugar coating such as used on pills and candy has proven useful.

In specific embodiments for use in internal combustion engine cooling systems, the material of spacers 44, 52 and 54 may be a stop leak material such as disclosed in U.S. Pat. No. 2,580,719 to be a mixture of plant root flour (passing a 50 mesh screen) and a soluble oil formed into the shape of spacers 44, 52 and 54. Additional water soluble binders or a coating 56 may be used if desired.

Thus, the invention provides an improved fluid valve for use in pressurized fluid systems of a great variety. Valve 10 of the invention may be a thermostatic valve or a pressure relief valve as above described. Both the thermostatic valve 10 and the pressure relief valve 10 may be fail-safe or non-fail-safe, as above described, and, each of these four different versions of the valve 10 of the invention may have its spacer in the form of each of any one of the spacers illustrated in FIGS. 9 through 12. Furthermore, the temperature and pressure triggers may be at any predetermined pressure or temperature required by the application, as will be well understood by a person skilled in the art.

In the thermostatic valve of the invention, the temperature at which the spacer will melt will usually be lower than the temperature which will actuate the valve, and both of these temperatures will be lower than the temperature that will cause the valve to fail-safe. Furthermore, the thermostatic valve may be provided with a spacer which is not temperature actuated, but is either soluble in the fluid flowing past the spacer, or is actuated by the movement of the valve either by pressure or temperature as illustrated in FIG. 12. In the specific embodiment of an internal combustion engine cooling system, spacers 44, 52, 54, 55 may only need to hold valve open for about one minute to allow the system to be filled.

Similarly, pressure relief valve 10 of the invention may be equipped with spacers which are temperature actuated or not temperature actuated and fail-safe or not fail-safe. If spacers 44, 52, 54, or 55 are utilized which are temperature actuated with the pressure relief valve which is fail-safe, normally, the temperature at which the spacers disappear is a temperature which is less than the fail-safe temperature. Other variations within the scope of the invention may also be devised with respect to specific applications well within the skill of a person skilled in the art.

In operation, the thermostatic valve 10 of the invention in a cooling system of an internal combustion engine would function after spacers 44, 52, 54, 55 melted, dissolved, or otherwise disappeared in all respects, the same as other thermostatic valves have operated in the past.

When the thermostatic valve 10 of the invention is first installed, spacers 44, 52, 54, 55 is between valve 26 and valve seat 18 and holds the valve open. This allows the method of the invention to be performed, and specifically, for the valve to be installed, the cooling system filled, and capped and pressurized all in a single operation.

In accordance with the method of the invention, a defective thermostatic valve in a cooling system may be replaced with the valve 10 of the invention more easily and with less labor involved than heretofore possible as follows. The cooling system is first uncapped and depressurized. Most of the time, inasmuch as there are no bleed valves on such cooling systems, the cooling system must be allowed to cool to ambient temperature before being uncapped to prevent the coolant from being exhausted of the system upon depressurizing the system.

The level of coolant in the system is then lowered such that the defective thermostatic valve may be removed without losing additional coolant. This requires the level of coolant to be lowered below the defective thermostatic valve.

The defective thermostatic valve is then removed from the system. Such removal usually requires the opening of a housing 14, removal of a housing gasket, removal of the defective thermostatic valve, replacing the defective thermostatic valve and gasket with a new gasket and a thermostatic valve 10 of the invention and closing the housing. Once the system is closed, the thermostatic valve of the invention allows the coolant to be replaced and circulated to purge air from the system by running the engine and the system to be capped before the system reaches operating temperature as it is repressurized, all in one operation.

With the thermostatic valve 10 of the invention being held open by the spacers 44, 52, 54, 55 the cooling system is brought up to operating temperatures at which time the spacer bas disappeared by melting, dissolving or by valve 10 opening far enough to allow the fluid to carry the spacer away. The valve 26 is then free to move with respect to valve seat 18 in response to the temperature of the coolant. In specific embodiments, the valve 10 need only be held open by spacers 44, 52, 54, 55 for about one to about two minutes. In one embodiment, the spacers 44, 52, 54 dissolve in the coolant, and in other embodiments, the spacer is melted and is carried away by the coolant later to dissolve or to be deposited in the system. Spacer 55 in the form of metallic ceramic balls merely wait for the temperature to rise sufficiently to allow valve 10 to fully open. At that time, balls 55 will merely fall out of valve 10. After removal of sapcers 44, 52, 54, 55, the cooling system will function as a conventional cooling system.

There is no need any more to fill the radiator, bring the engine to operating temperatures, release the pressure and refill the radiator at repetitive times to make sure that a radiator is completely filled, and expose oneself to superheated steam or hot liquids.

The valve 10 of the invention also has usefulness in other systems in which a valve is required and it is desirable to hold the valve open until a set temperature is achieved. Such systems include the more recent automatic transmissions in which fluid pressure and pressure sensors are utilized to feed electrical impulses to a computerized control which shifts the transmission in response to the pressure differential. In this embodiment, by properly positioning the thermostatic valve 10 of the invention in selective transmission fluid passageways, the transmission may be protected from excessive transmission fluid temperature and made to fail safe by altering the fluid pressure by the closure of valve 26 of the valve 10 of the invention at a predetermined temperature above the normal operating temperatures. By the closure of the valve 26, in this specific embodiment, the transmission will not shift out of first gear, thus notifying the operator of a problem, but at the same time allowing the operator to take the automobile to a service station before failure or irreparable damage of the transmission occurs.

In another pressurized fluid system, valve 10 of the invention may be utilized as the pressure relief valve in a conventional hot water heater. Conventionally, these hot water beaters have beaters both top and bottom of a large hot water tank and must be filled completely with water prior to lighting the pilot on gas fired heaters, or throwing the circuit breaker on electrically heated heaters to prevent heating units from burning out. This has proven difficult inasmuch as, once again, all of these heaters are provided with a pressure relief valve for relieving excessive pressure. These pressure relief valves are spring loaded valves similar to the type disclosed herein, but which only at pressures far above that necessary to bleed the tank of air, and thereby allow the tank to be filled with water upon installation.

Therefore, a pressure relief valve 10 of the invention may be utilized with a hot water heater of the type above described to bold the pressure relief valve open for a short time such that all of the air in the tank can be bled from the tank and the tank properly filled and the tank pilot light or circuit breaker thrown all in one operation. With the improved pressure relief valve of the invention having a spacer 44, 52, 54, 55 holding the valve open to allow the air to escape from the tank until completely full, the burners of the hot water heater can be ignited almost immediately and water flow can exit the pressure relief valve until the spacer is melted, dissolved, or the predetermined temperature is released, whichever be the case.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A valve comprising a frame having a valve seat defining a flow passage, an actuator secured to said frame, a valve secured to said activator and movable into and out of engagement with said valve seat in response to said actuator for closing and opening said flow passage at predetermined fluid conditions, and a spacer between said valve and valve seat, said spacer holding said valve and valve seat apart, said spacer being of a disappearing material at said predetermined fluid conditions, whereby the valve may be installed in a fluid system, said system filled with fluid and brought to normal operating conditions, simultaneously.

2. The valve of claim 1 wherein said spacer is soluble in said fluid at said predetermined conditions.

3. The valve of claim 1 wherein said spacer is meltable at said predetermined conditions.

4. The valve of claim 1 wherein the material of said spacer reacts with said fluid at said predetermined fluid conditions to form a material which is dispersable in said fluid.

5. The valve of claim 1 wherein the material of said spacer reacts with said fluid at said predetermined fluid conditions to form a material which is meltable at said predetermined conditions.

6. The valve of claim 1 wherein said actuator is thermally responsive.

7. The valve of claim 1 further comprising a fail-safe device wherein the securance of said actuator to said frame is by a fusible link which at a release temperature above said predetermined temperature severs the securance between said actuator and said frame.

8. The valve of claim 7 wherein said securance of said actuator to said frame and said spacer are both frangible, said spacer being frangible at said predetermined temperature, said securance being frangible at a release temperature which is substantially above said predetermined temperature.

9. The valve of claim 1 wherein said spacer is in the form of at least one elongated member extending across said flow passage between said valve seat and said valve.

10. The valve of claim 1 wherein said spacer is a plurality of members positioned between said valve and said valve seat.

11. The valve of claim 1 wherein said spacer is a disc having an opening therein which is positioned generally concentric with said flow passage, said disc having grooves extending radially thereof which define radially extending flow passages.

12. The valve of claim 1 wherein said spacer is a disc having holes therein which are positioned generally concentric with said flow passage, said disc having grooves extending radially thereof which define radially extending flow passages.

13. The valve of claim 1 wherein said spacer is a disc having balls therein which are positioned generally concentric with said flow passage, said disc having grooves extending radially thereof which define radially extending flow passages.

14. A method of replacing a defective valve in a pressurized fluid system with another valve comprising the steps of uncapping and depressurizing the system, removing said defective valve, installing a new valve in place of said defective valve, said new valve having a frame having a valve seat defining a flow passage, an actuator secured to said frame, a valve secured to said actuator and movable into and out of engagement with said valve seat in response to said actuator for closing and opening said flow passage at predetermined fluid conditions, and a spacer between said valve and valve seat, said spacer holding said valve and valve seat apart, said spacer being of a disappearing material at said predetermined fluid conditions, filling said fluid system with coolant to operating levels, circulating said fluid throughout said system, capping said system, and removing said spacer from between said valve and valve seat, whereby said system may be filled and brought to operational temperature and pressure all in a single operation after said defective valve has been replaced.

15. The method of claim 14 wherein said spacer is soluble in said fluid at said predetermined conditions.

16. The method of claim 14 wherein said spacer is meltable at said predetermined conditions.

17. The method of claim 14 wherein the material of said spacer reacts with said fluid at said predetermined conditions to form a material which is dispersable in said fluid.

18. The method of claim 14 wherein the material of said spacer reacts with said fluid at said predetermined conditions to form a material which is meltable at said predetermined conditions.

19. The method of claim 14 wherein said actuator is thermally responsive.

20. The method of claim 14 further comprising a fail-safe device wherein the securance of said actuator to said frame is by a fusible link which at a release temperature above said predetermined temperature severs the securance between said actuator and said frame.

21. The method of claim 14 wherein said spacer is in the form of at least one elongated member extending across said flow passage between said valve seat and said valve.

22. The method of claim 14 wherein said spacer a plurality of members positioned between said valve and said valve seat.

23. The method of claim 14 wherein said spacer is a disc having an opening therein which is positioned generally concentric with said flow passage, said disc having grooves extending radially thereof which define radially extending flow passages.

24. The method of claim 14 wherein said spacer is a disc having holes therein which are positioned generally concentric with said flow passage, said disc having grooves extending radially thereof which define radially extending flow passages.

25. The method of claim 14 wherein said spacer is a disc having balls therein which are positioned generally concentric with said flow passage, said disc having grooves extending radially thereof which define radially extending flow passages.

26. The method of claim 14 further comprising an attachment flange secured to said frame, the securance of said flange to said frame being frangible at a release temperature higher than said predetermined temperature whereby said thermostatic valve is fail-safe at temperatures above said release temperature.

27. The method of claim 14 wherein said removing step is performed by allowing said spacer to disintegrate in said fluid at operational conditions.

28. The method of claim 19 wherein said predetermined fluid condition is a preset fluid temperature.

29. The method of claim 19 wherein said predetermined fluid condition is a preset fluid pressure.

30. The method of claim 14 wherein said valve is a thermostat and said pressurized fluid system is an internal combustion engine cooling system.

* * * * *